(12) United States Patent
Smith, III et al.

(10) Patent No.: US 7,548,602 B2
(45) Date of Patent: Jun. 16, 2009

(54) SPACER GRID WITH MIXING VANES AND NUCLEAR FUEL ASSEMBLY EMPLOYING THE SAME

(75) Inventors: Levie D. Smith, III, Columbia, SC (US); Michael A. Marzean, Columbia, SC (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 73 days.

(21) Appl. No.: 11/372,431

(22) Filed: Mar. 9, 2006

(65) Prior Publication Data

US 2007/0211843 A1 Sep. 13, 2007

(51) Int. Cl.
*G21C 3/34* (2006.01)

(52) U.S. Cl. .................. 376/439; 376/443; 376/438

(58) Field of Classification Search .............. 376/438, 376/439, 440, 441, 442, 443; 373/439, 443, 373/438, 440–442
See application file for complete search history.

(56) References Cited

U.S. PATENT DOCUMENTS

| | | | |
|---|---|---|---|
| 3,862,000 A | 1/1975 | Pugh et al. | |
| 4,578,240 A | 3/1986 | Cadwell | |
| 4,692,302 A | 9/1987 | DeMario et al. | |
| 4,726,926 A | 2/1988 | Patterson et al. | |
| 4,758,403 A | 7/1988 | Noailly | |
| 4,879,090 A | 11/1989 | Perrotti et al. | |
| 4,913,875 A * | 4/1990 | Johansson et al. | 376/439 |
| 5,110,540 A | 5/1992 | Verdier | |
| 5,180,548 A | 1/1993 | Verdier | |
| 5,265,140 A | 11/1993 | Perrotti | |
| 5,283,821 A | 2/1994 | Karoutas | |
| 5,299,245 A * | 3/1994 | Aldrich et al. | 376/439 |
| 5,339,341 A | 8/1994 | King et al. | |
| 5,440,599 A * | 8/1995 | Rodack et al. | 376/439 |
| 6,130,927 A * | 10/2000 | Kang et al. | 376/462 |
| 6,236,702 B1 | 5/2001 | Chun et al. | |
| 6,278,759 B1 | 8/2001 | Yoon et al. | |
| 6,393,087 B1 | 5/2002 | Oh et al. | |
| 6,421,407 B1 * | 7/2002 | Kang et al. | 376/439 |
| 6,507,630 B1 * | 1/2003 | Smith et al. | 376/439 |
| 6,519,309 B1 | 2/2003 | Van Swam | |
| 6,606,369 B1 * | 8/2003 | Smith et al. | 376/438 |
| 6,765,979 B1 * | 7/2004 | Dix et al. | 376/435 |
| 6,807,246 B1 | 10/2004 | Kim et al. | |
| 6,819,733 B2 | 11/2004 | Broders et al. | |

* cited by examiner

*Primary Examiner*—Rick Palabrica

(57) ABSTRACT

A spacer grid having tunable mixing vanes for optimizing coolant flow is provided for a nuclear fuel assembly. The mixing vanes include an upper piece and a lower piece, which are coupled to a middle ligament that is coupled to the top or downstream portion of one or more of the grid straps forming the spacer grid. The upper piece, lower piece, and middle ligament are bent, rotated, and/or twisted into various positions to more effectively mix the coolant and affect the coolant's flow as it moves upwards through the fuel assembly. For example, in one embodiment, the mixing vane has an "S" shape wherein the middle ligament is positioned parallel to the longitudinal axes of the fuel rods of the fuel assembly, the upper piece bends towards one of the fuel rods, and the lower piece bends away from the fuel rod. In this manner, optimized even and sustained mixing of the coolant is provided.

29 Claims, 7 Drawing Sheets

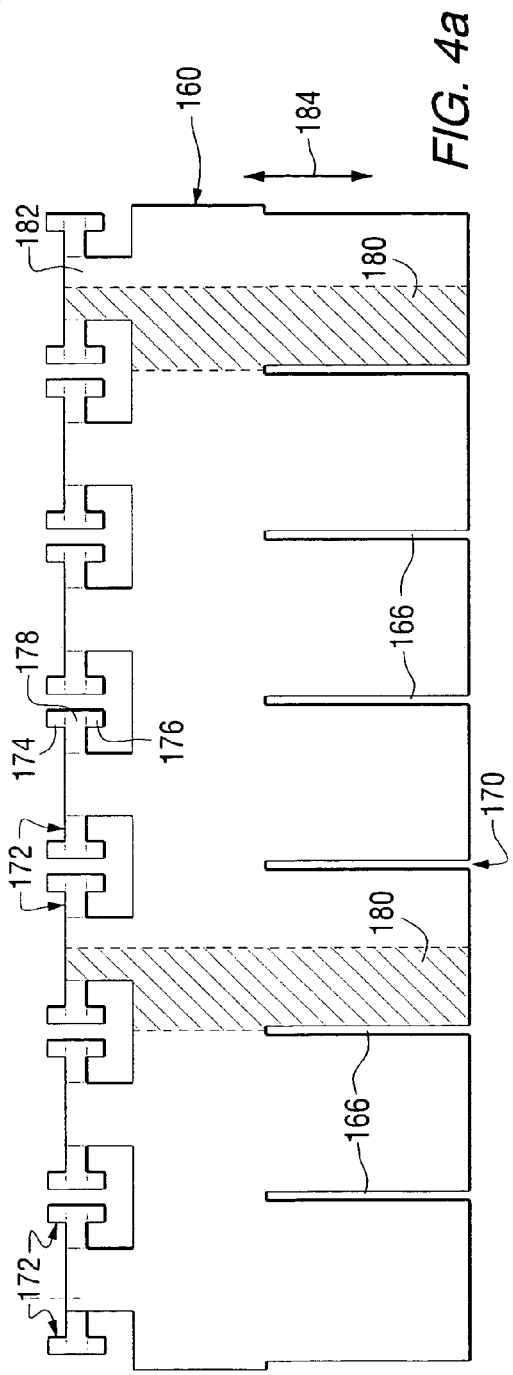
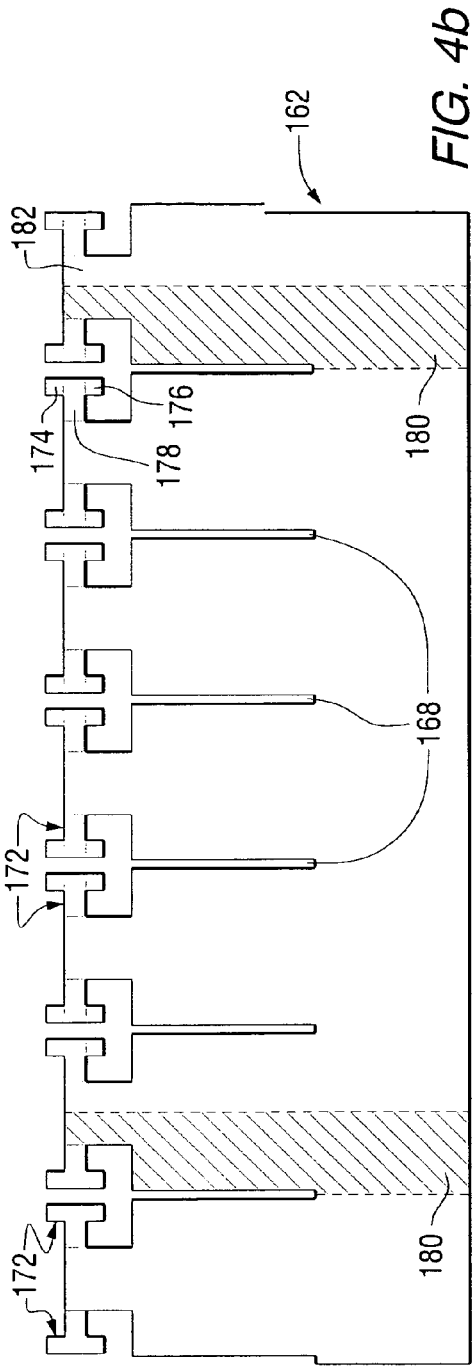

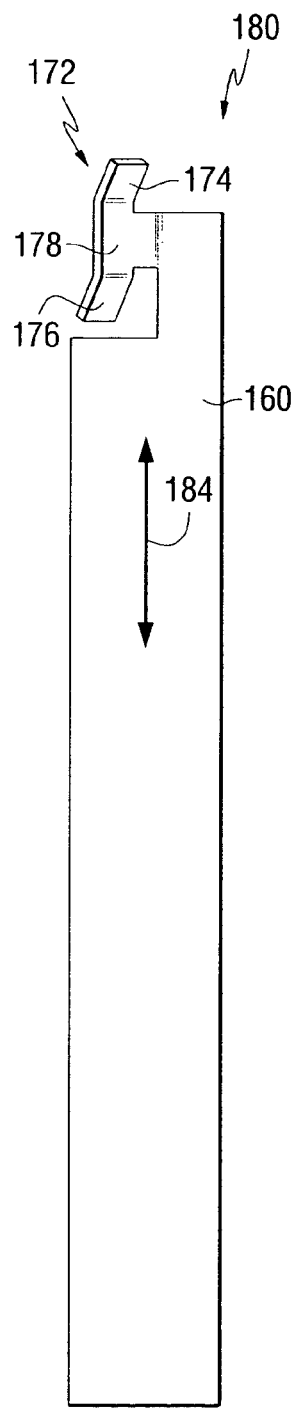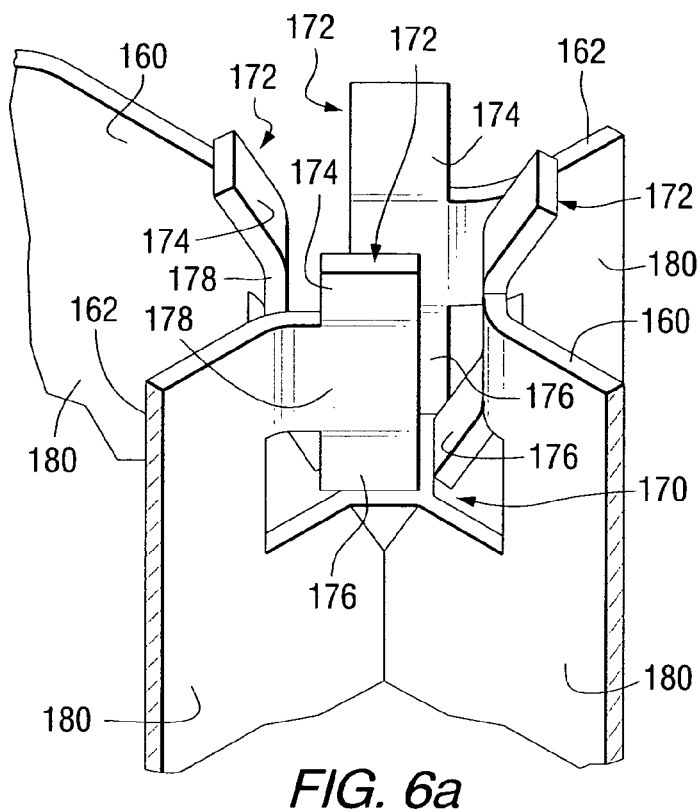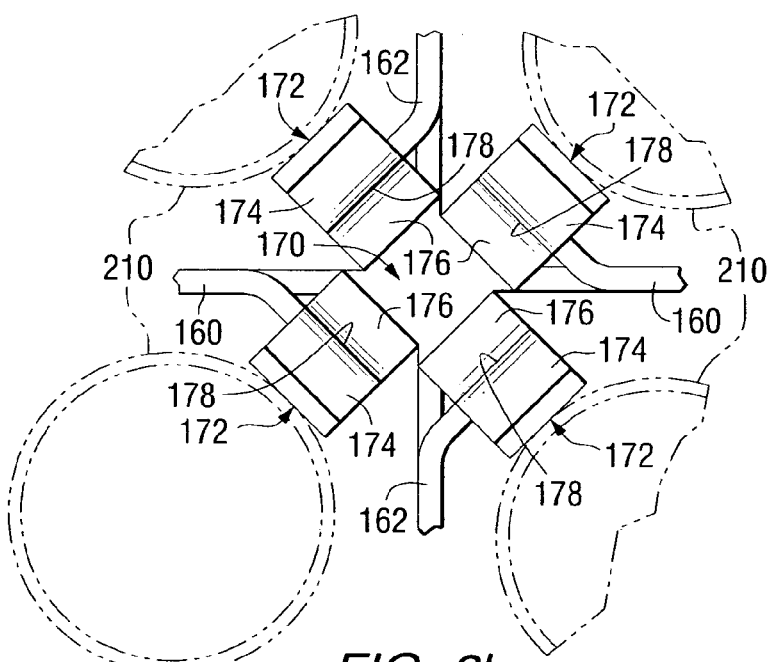
FIG. 5
FIG. 6a
FIG. 6b

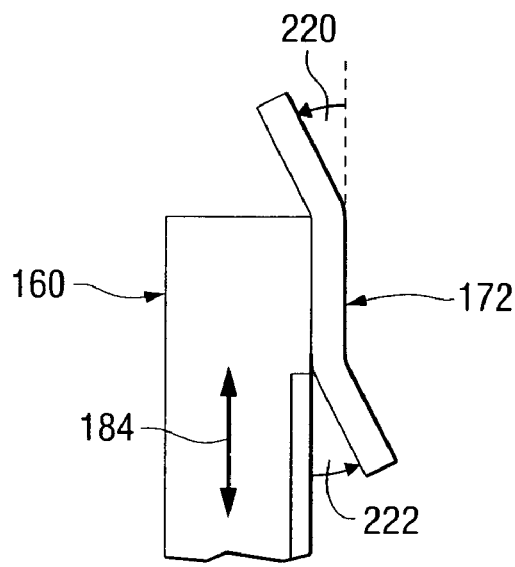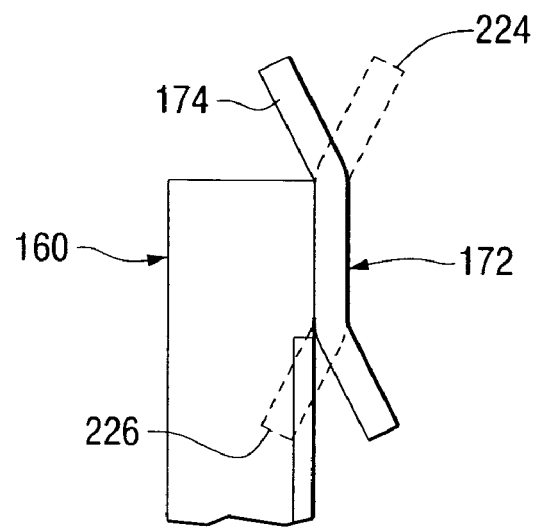
FIG. 8a    FIG. 8b
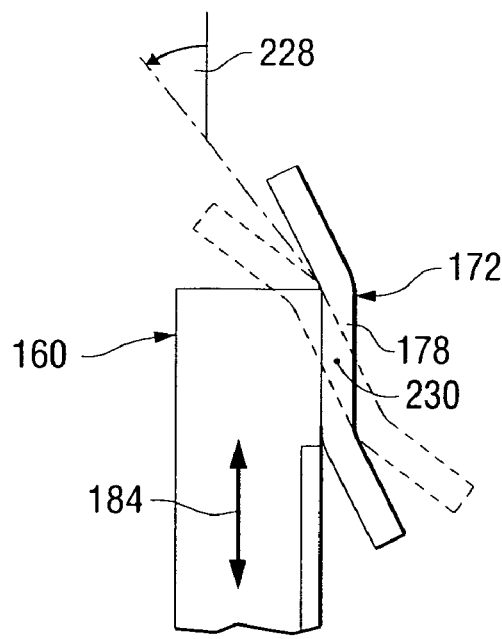
FIG. 9

SPACER GRID WITH MIXING VANES AND NUCLEAR FUEL ASSEMBLY EMPLOYING THE SAME

FIELD OF THE INVENTION

The present invention relates generally to nuclear reactors and, more particularly, to spacer grids for a nuclear fuel assembly, including mixing vanes to effectively mix coolant as it flows through the fuel assembly.

BACKGROUND INFORMATION

Nuclear fuel assemblies for light water nuclear reactors, such as, for example, pressurized water reactors (PWRs) and boiling water reactors (BWRs), generally include a plurality of fuel rods with circular cross-sections that are arranged parallel to one another at regularly or irregularly spaced intervals. Each fuel rod comprises a stack of fuel pellets (e.g., uranium oxide pellets) surrounded with cladding that is made from zirconium alloy or other suitable material. The fuel rods are held at the spaced intervals with respect to one another by one or more spacer grids. Each spacer grid includes a plurality of interlocking grid straps that are welded together to form an array of four-walled cells in an "egg-crate" configuration. A fuel rod may be contained within each of the four-walled cells. The entire fuel assembly typically has a square cross-section with a 14×14, 15×15, 16×16, or 17×17 array of fuel rods. One or more outer straps may encircle the periphery of each spacer grid.

FIG. 1 presents a partial perspective view of a conventional spacer grid 100 for a fuel assembly 102. The spacer grid 100 includes two sets of perpendicularly placed grid straps 112, 114. Each grid strap 112, 114 includes a series of regularly spaced notches (not shown) that allow for the assembly and interlocking of the grid straps 112, 114 to form an array of four-walled cells 116. Each four-walled cell 116 contains four intersections 118. The grid straps 112, 114 may be welded together at these intersections 118. The purpose of the four-walled cell 116 is to support a single fuel rod 130 (FIG. 2) in the square array of the fuel assembly 102. The periphery of the grid straps 112, 114 may be encircled with one or more outer straps 120. A plurality of springs 122 and a plurality of dimples 124 are integrally formed on, or attached to, the grid straps 112, 114 and extend inwardly within each four-walled cell 116. The springs 122 and dimples 124 provide support structures for contacting the fuel rod cladding and holding it within the four-walled cell 116.

FIG. 2 presents a cross-sectional top plan view of one of the aforementioned four-walled cells 116, with a fuel rod 130 contained therein. As shown, the springs 122 and dimples 124 extend inwardly within the four-walled cell 116 to engage and provide support for the fuel rod 130, as previously discussed.

When the PWR or BWR is in use, a coolant, such as for example, water, flows from the bottom of the fuel assembly upwards through the spaces between the fuel rods. The temperature of the coolant varies as it travels upwards, absorbing thermal energy from the fuel rods. At locations adjacent to the fuel rods, the coolant may be partially overheated, which can adversely affect the thermal performance of the fuel assembly and reduce the output power of the fuel rods. One way of alleviating these partially overheated regions is to design the spacer grids to more effectively deflect and mix the coolant as it flows upwards through the fuel assembly, thereby promoting a more uniform distribution of coolant temperature. Such a design can be accomplished by attaching "mixing vanes" to the top, downstream portion of the grid straps that comprise the spacer grid, as shown. The mixing vanes are intended to promote the flow of coolant in a lateral direction as well as a longitudinal direction along the fuel rod axes. This flow pattern allows the coolant to more effectively move between the fuel rods, and between the lower temperature regions and the partially overheated regions of the fuel assembly.

FIG. 3 presents a partial perspective view of a grid strap 140 and conventional PWR mixing vane 142, wherein the mixing vane 142 is disposed at the top, downstream portion of a cell wall 144. It should be noted that although they are generally similar in configuration to the PWR vane shown, BWR vanes are typically much smaller in size. Other conventional mixing vane designs are disclosed in U.S. Pat. No. 5,440,599 to Rodack et al., U.S. Pat. No. 6,807,246 to Kim et al., U.S. Pat. No. 3,862,000 to Pugh et al., U.S. Pat. No. 4,758,403 to Noailly, U.S. Pat. No. 5,299,245 to Aldrich, U.S. Pat. No. 5,283,821 to Karoutas, U.S. Pat. No. 6,606,369 to Smith III et al., U.S. Pat. No. 6,278,759 to Yoon et al., U.S. Pat. No. 4,692,302 to DeMario et al., U.S. Pat. No. 5,265,140 to Perrotti, U.S. Pat. No. 6,236,702 to Chun et al., and U.S. Pat. No. 5,339,341 to King et al. Nozzle-type mixing vanes are disclosed in U.S. Pat. No. 4,726,926 to Patterson et al. and U.S. Pat. No. 6,130,927 to Kang et al.

Conventional mixing vanes, however, tend to be restricted in the ways in which they deflect the flow of coolant as it moves upwards through the fuel assembly. They do not provide a robust means for adjusting or tuning the vanes in order to optimize the flow pattern that is formed. As a result, conventional mixing vanes cannot effectively achieve the most desirable type of coolant flow—even and sustained mixing—for the particular application at hand. Thus, there exists a need for a new type of mixing vane that guides the coolant in a desired flow pattern to more effectively mix the coolant as it moves upward through the fuel assembly.

SUMMARY OF THE INVENTION

The present invention provides a spacer grid for a nuclear fuel assembly having a plurality of elongated fuel rods. The spacer grid employs novel mixing vanes which include an upper piece and a lower piece, which are connected to a middle ligament that is coupled to the top or downstream portion of a grid strap forming the spacer grid. Although the present invention is not limited to any particular number of mixing vanes, in a preferred embodiment, each four-walled cell of the spacer grid may contain four mixing vanes—one positioned at the top, downstream portion of each wall. The upper piece, lower piece, and middle ligament may be bent, rotated, and/or twisted into various positions to more effectively mix the coolant and affect the coolant's flow as it moves upwards through the fuel assembly. In a preferred embodiment, the mixing vane has an "S" shape when viewed from an end elevational vantage point. More specifically, the middle ligament is positioned parallel to the longitudinal axes of the fuel rods, the upper piece is bent towards the fuel rod, and the lower piece is bent away from the fuel rod, thereby defining the general S-shape. In another preferred embodiment, the mixing vane has a parabolic shape when viewed from the end elevational vantage point. A nuclear fuel assembly employing such mixing vanes, is also disclosed.

An object of the present invention is to provide a mixing vane that is tunable in order to affect (i.e., control or adjust) and thus optimize for the particular application at hand the coolant flow pattern that is formed, rather than merely deflecting the coolant flow.

Another object of the present invention is to provide a mixing vane that promotes optimized even and sustained interchannel mixing.

Yet another object of the present invention is to provide a mixing vane that more effectively mixes coolant as it moves upwards through the fuel assembly, thereby mitigating regions of varying coolant temperature.

A further object of the present invention is to provide mixing vane that is easily manufactured using conventional die technology.

Another object of the present invention is to provide a mixing vane with an upper piece, a lower piece, and a middle ligament, that are easily tuned or adjusted by bending, rotating, and twisting, in order to optimize the coolant flow.

These and other objects of the present invention will become more readily apparent from the following detailed description and appended claims.

BRIEF DESCRIPTION OF THE DRAWINGS

FIGS. 4a and 4b are partial elevational views of two types of perpendicularly positioned, interlocking grid straps in accordance with a preferred embodiment of the present invention.

FIG. 5 is an elevational view of a portion of one grid strip which defines a single cell wall, and mixing vane that has been bent in accordance with a preferred embodiment of the present invention.

FIGS. 6a and 6b are partial perspective and top plan views, respectively, of a grid strap intersection of a spacer grid in accordance with a preferred embodiment of the present invention.

FIGS. 8a and 8b are schematic views of an S-shaped mixing vane with various bend angles in accordance with preferred embodiments of the present invention.

FIG. 9 is a schematic view of an S-shaped mixing vane that has been rotated in accordance with preferred embodiments of the present invention.

DETAILED DESCRIPTION OF THE PREFERRED EMBODIMENTS

Figure 1:
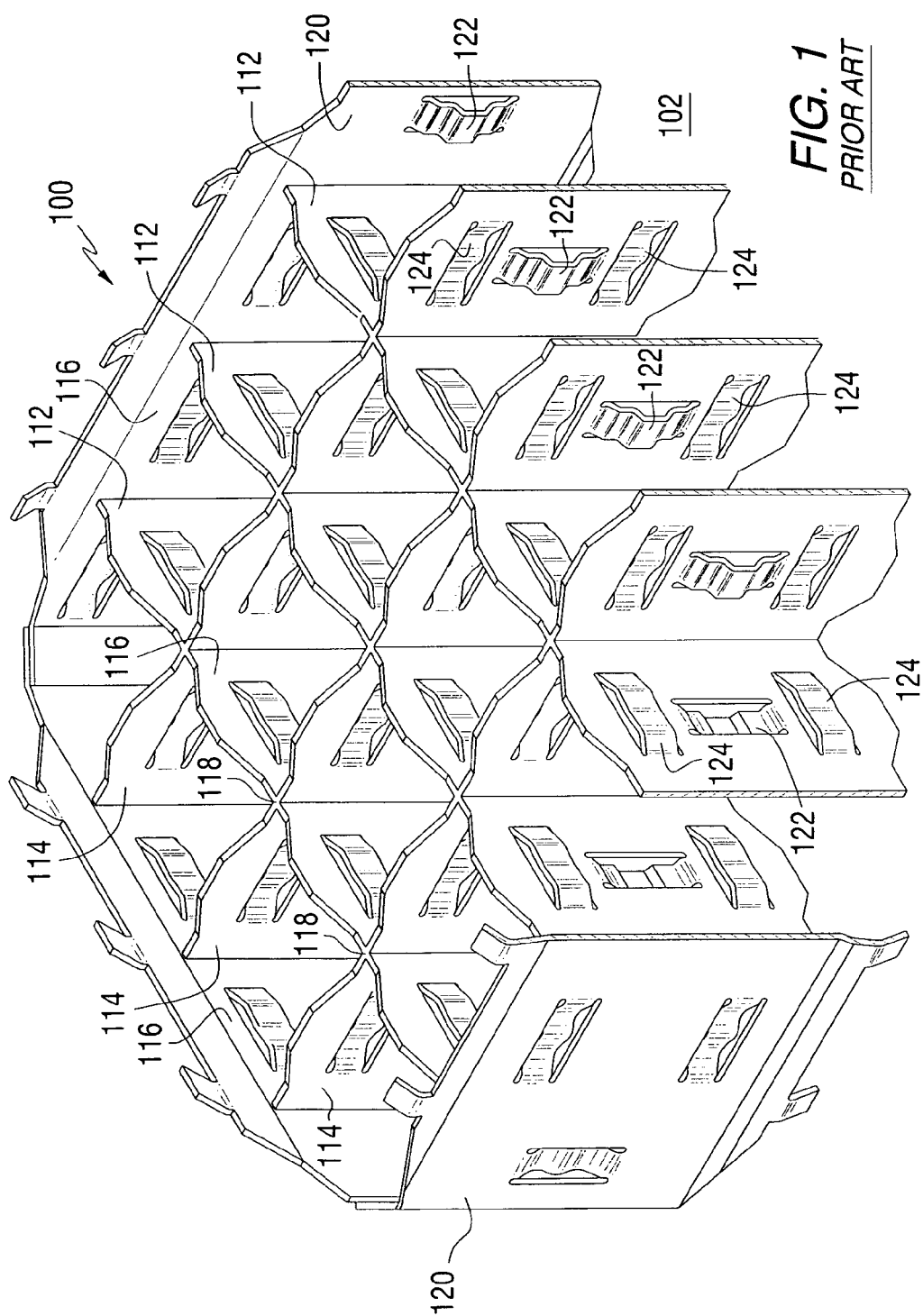
FIG. 1 is a partial perspective view of a conventional spacer grid for use with a fuel assembly having a square cross-section.
Figure 2:
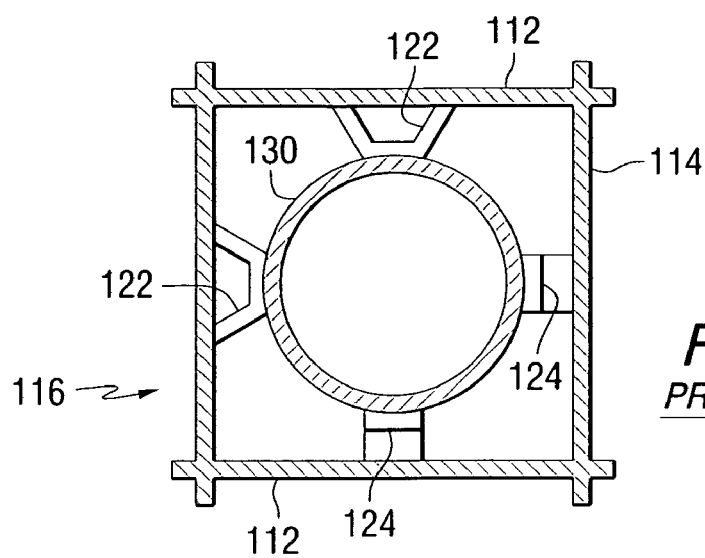
FIG. 2 is a cross-sectional view of a four-walled cell and fuel rod located within a conventional spacer grid.
Figure 3:
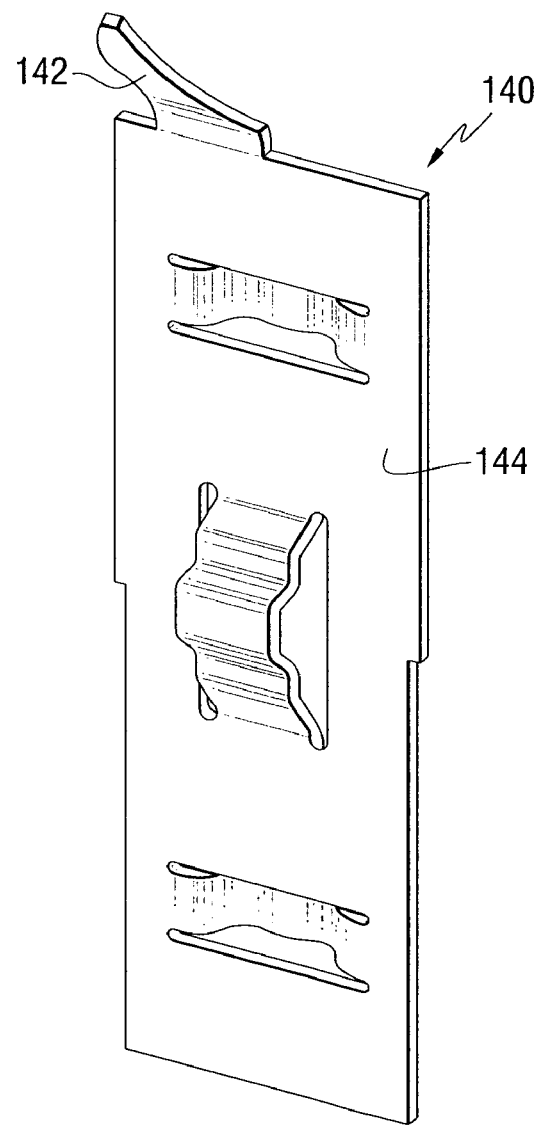
FIG. 3 is a partial perspective view of a grid strap and conventional mixing vane.

The description contained herein primarily refers to the use of a mixing vane having a generally rectangular shape. It will, however, be appreciated the mixing vanes may have any suitable shape, size, or dimensions. It will also be appreciated that although each mixing vane is contemplated as being formed from the grid strap material and connected to the grid strap as an integral component, that the mixing vanes could also be connected by welding, brazing, or mechanically securing them to the grid straps. The mixing vanes can also be made from any known or suitable material (e.g., without limitation zirconium alloy or nickel-steel alloy). It will further be appreciated that the Figures provided herein are provided for simplicity of illustration of only certain examples or variations of mixing vanes in accordance with the invention, and are not meant to be limiting upon the scope of the invention. It will also be appreciated that the Figures and, in particular, certain features depicted therein, are not drawn to scale.

Directional phrases used herein, such as, for example, clockwise, counterclockwise, top, bottom, upper, lower and derivatives thereof, relate to the orientation of the elements shown in the drawings and are not limiting upon the claims unless expressly recited therein.

As used herein, the terms "bend" and "bend angle" are used when referring to a bend in the upper or lower piece of the mixing vane. The terms "rotate" and "rotation angle" are used when referring to a rotation of the middle ligament. The terms "twist" and "degree of twist" are used when referring to a twist of the upper piece, lower piece, or middle ligament.

As employed herein, the statement that two or more parts are "coupled" together shall mean that the parts are joined together either directly or joined through one or more intermediate parts.

FIGS. 4a, 4b, 5, 6a, 6b and 7 illustrate a preferred embodiment of the present invention in which the grid straps of a spacer grid include generally S-shaped mixing vanes. While the present invention is not limited to any particular number of mixing vanes, four mixing vanes are positioned around each fuel rod and four-walled cell in the preferred embodiment (best shown in FIG. 7).

FIGS. 4a and 4b are partial elevational views of two types of perpendicularly positioned, interlocking grid straps 160, 162. To form the spacer grid 200 (FIG. 7), a plurality of these grid straps 160, 162 are placed perpendicular to each other and connected together such that the downwardly positioned notches 166 on the first type of grid strap 160, shown in FIG. 4a, engage the upwardly positioned notches 168 on the second type of grid strap 162, shown in FIG. 4b. The location where the notches 166, 168 are connected is known as a grid strap intersection 170 (FIGS. 6a and 6b). Each grid strap 160, 162 includes a plurality of mixing vanes 172, which are shown in a flattened state in the unassembled views of FIGS. 4a and 4b.

Each mixing vane includes an upper piece 174 and a lower piece 176 that are connected to a middle ligament 178. The middle ligament 178 is connected to the grid strap 160, 162. While the present invention is not limited to any particular number of mixing vanes 172, each cell wall 180 (two cell walls 180 are shown in cross-hatch in FIGS. 4a and 4b) of each grid strap 160, 162 preferably contains a single mixing vane 172. The mixing vane 172 may be connected to the grid strap 160, 162 at its top or "downstream" portion 182. The mixing vane 172 is preferably connected to the grid strap 160, 162 so that the middle ligament extends outward from the grid strap 160,162 in a direction that is substantially orthogonal with respect to the longitudinal axis 184 of the cell wall 180. For simplicity of illustration, the grid straps 160, 162 in the examples of FIGS. 4a and 4b are shown without springs and dimples in the cell walls 180. It will, however, be appreciated that any suitable number and configuration of dimples and springs could be employed (see, for example, FIG. 7). It will also be appreciated that although the mixing vanes 172 of FIGS. 4a and 4b are shown in a flattened position, prior to being assembled, the mixing vanes 172 are preferably bent and/or twisted into various positions to positively affect and thus optimize the flow of coolant as it moves through the fuel assembly. More specifically, the vanes 172 may be adjusted or fine tuned in order to optimize the coolant flow, as desired, for the particular application in which they are being employed.

FIG. 5 is an elevational view of a single cell wall 180 and mixing vane 172 that has been bent in accordance with a preferred embodiment of the invention. Specifically, the upper piece 174 of the vane 172 has been bent at its connection with the middle ligament 178, and placed at a "bend angle" of approximately +45 degrees from the vertical. The vertical direction is defined by the longitudinal axis 184 of the cell wall 180. The lower piece 176 of the vane 172 has also been bent at its connection with the middle ligament 178, and placed at a "bend angle" of approximately −45 degrees from the vertical. The middle ligament 178 has been bent at its connection with the grid strap 160 and placed at a "rotation angle" of approximately −45 degrees with respect to the plane of the grid strap 160. A negative rotation angle for the middle ligament 178 indicates a counterclockwise rotation when viewed from the top of the fuel assembly, and a positive rotation angle indicates a clockwise rotation. Despite its rotation, the middle ligament 178, in the example shown, remains vertically aligned and parallel to the longitudinal axis 184 of the cell wall 180. Thus, the mixing vane 172 appears to have an S-shape when it is viewed directly from the side (i.e., from the left end with respect to FIG. 5). As noted previously with respect to FIGS. 4a and 4b, although the grid strap 160 of FIG. 5 does not show springs or dimples in cell wall 180, it will be appreciated that any suitable number and configuration of dimples and springs could be employed (see, for example, FIG. 7).

FIG. 6a is a partial perspective view of a grid strap intersection 170 of the spacer grid, and FIG. 6b is a top plan view of such intersection 170. As noted previously, the grid strap intersection 170 occurs where two grid straps 160, 162 have been perpendicularly positioned and interlocked together using their upwardly and downwardly positioned notches 166,168 (FIGS. 4a and 4b). Because each grid strap cell wall 180 contains a single mixing vane 172, the grid strap intersection 170 is surrounded with a total of four mixing vanes 172, two per grid strap 160, 162. The upper piece 174 of each vane 172 has been bent at its connection with the middle ligament 178, and placed at a bend angle of approximately +45 degrees from the vertical. The lower piece 176 of each vane 172 has been bent at its connection with the middle ligament 178, and angled approximately −45 degrees from the vertical. A positive angle for the upper or lower piece 174, 176 indicates that the piece has been bent away from the grid strap intersection 170, and towards an adjacent fuel rod (not shown). A negative angle for the upper or lower piece 174, 176 indicates that the piece has been bent towards the grid strap intersection 170, and away from an adjacent fuel rod (not shown). This may be further appreciated and understood with reference to the top plan view of FIG. 6b. The middle ligament 178 of each vane 172 has been bent at its connection with the grid strap 160, 162, and placed at a rotation angle of approximately +30 degrees from the plane of each grid strap 160, 162. A positive rotation angle for the middle ligament 178 indicates a clockwise rotation when viewed from a top plan view perspective (see, for example, FIG. 6b), and a negative rotation angle indicates a counterclockwise rotation.

The top plan view of FIG. 6b further shows the interaction of the mixing vanes 172 with fuel rods 210 of the fuel assembly. One complete fuel rod 210 (shown in simplified form in phantom line drawing) and portions of the three adjacent fuel rods 210, are shown.

Figure 7:
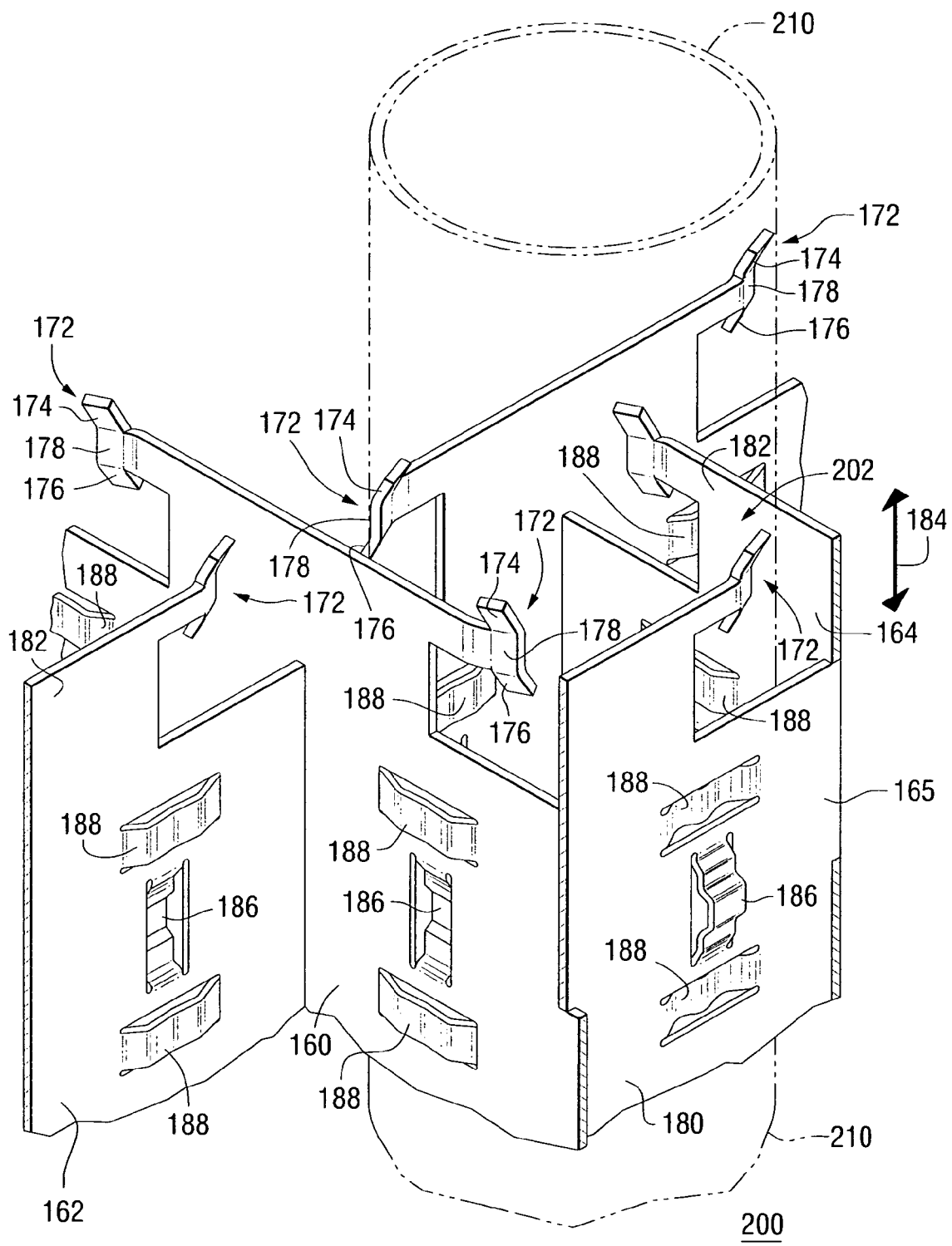
FIG. 7 is a partial perspective view of a portion of a spacer grid and a single four-walled cell thereof in accordance with a preferred embodiment of the present invention.

FIG. 7 is a partial perspective view of a spacer grid 200 in accordance with the invention. For simplicity of illustration, only one complete four-walled cell 202 of the spacer grid 200 is shown. It will be appreciated, however, that the spacer grid 200 in accordance with the invention forms any known or suitable array of a plurality of four-walled cells 202, similar for example, to the spacer grid 100 shown in FIG. 1. It will also be appreciated that FIG. 7 and, in particular mixing vanes 172, are not drawn to scale. The four-walled cell 202 occurs where four grid straps 160, 162, 164, 165 interlock in a generally perpendicular configuration to create an opening for supporting a fuel rod 210 (shown in simplified form in phantom line drawing) therein. As shown, each grid strap 160, 162, 164, 165 includes a plurality of springs 186 and dimples 188 of any known or suitable orientation, for securing the fuel rod 210. Since each cell wall 180 includes a single mixing vane 172, a total of four mixing vanes 172 surround the fuel rod 210 and four-walled cell 202. The upper piece 174 of each vane 172 has a bend angle of approximately +45 degrees from the vertical 184. The positive angle indicates that the piece has been bent towards the fuel rod 210. The lower piece 176 of each vane 172 has a bend angle of approximately −45 degrees from the vertical. The negative angle indicates that the piece has been bent away from the fuel rod 210. The middle ligament 178 of each vane 172 has a rotation angle of approximately +45 degrees from the plane of each grid strap 160, 162, 164, 165, with the positive angle indicating a clockwise direction of rotation when viewed from a top plan view perspective.

Accordingly, the spacer grid 200 includes a plurality of perpendicular, interlocking grid straps 160, 162, 164, 165 that define the aforementioned grid strap intersections 170 (FIGS. 6a and 6b) and the four-walled cells 202. When viewed from an end elevational vantage point, each mixing vane 172 appears to have an S-shape. It is in this manner (i.e., the upper piece 174 bending toward fuel rod 210, the lower piece 176 bending toward the fuel rod 210, and the middle ligament 178 rotating toward the fuel rod) that the exemplary mixing vanes 172 assist in mixing coolant to create optimized even and sustained mixing (e.g., without limitation, a strong swirl and interchannel mixing) of the coolant as it moves upwards through the fuel assembly.

The present invention is not, however, limited to the embodiment shown hereinbefore. It will be appreciated that a wide variety of other mixing vane configurations are within the scope of the invention. For example, the upper and lower pieces of the mixing vane can have any suitable positive or negative bend angle 220, 222 with respect to the vertical (i.e., the longitudinal axis 184 of the cell wall 180), ranging from about 0 to about +90 degrees or about 0 to about −90 degrees.

FIG. 8a is a side view of an S-shaped mixing vane 172 which shows how bend angles 220, 222 of the upper piece 174 and lower piece 176 are measured from the vertical or longitudinal axis 184 of the grid strap 160. FIG. 8b illustrates example alternative bends 224, 226 for the upper piece 174 and lower piece 176 of the mixing vane 172 (with the alternatives shown in dashed line drawing). In the example of FIG. 8b, the upper piece 174 and/or lower piece 176 have bends 224, 226 ranging from about 0 to +45 degrees or about 0 to −45 degrees. It will also be appreciated, however, that the upper and lower pieces 174, 176 could alternatively both be bent towards an adjacent fuel rod, in order to form a parabolic-shaped mixing vane (not shown). It will also be appreciated that, rather than being bent, the upper and/or lower pieces 174, 176 could remain unbent (i.e., vertical at 0 degrees). It will still further be appreciated that while the upper and lower pieces 174, 176 are preferably bent at their connection with the middle ligament 178, a bend could occur at any location along the upper and lower piece 174, 176, and/or each piece 174, 176 can contain multiple bends (not shown).

FIG. 9 is a side view of an S-shaped mixing vane 172 which shows how the rotation angle 228, as previously defined herein, for the middle ligament 178 is measured from the vertical or longitudinal axis 184 of the grid strap (i.e., 160). It will be appreciated that the middle ligament 178 may have any positive or negative rotation angle 228 with respect to the vertical, ranging from about 0 to +90 degrees or from about 0 to −90 degrees. For example, in one embodiment, shown in dashed line drawing, the middle ligament 178 is rotated from about 0 to +45 degrees (towards a fuel rod) or from about 0 to −45 degrees (away from a fuel rod). However, as shown in solid line drawing, rather than being rotated, the middle ligament 178 may remain at 0 degrees, parallel to the vertical. Additionally, while the example of FIG. 9 shows a pivot point 230 that is located approximately at the center of the middle ligament 178, the pivot point may occur at any location on the middle ligament 178. A middle ligament 178 may also contain multiple pivot points (not shown) and therefore multiple rotation angles (not shown).

Figure 10A:
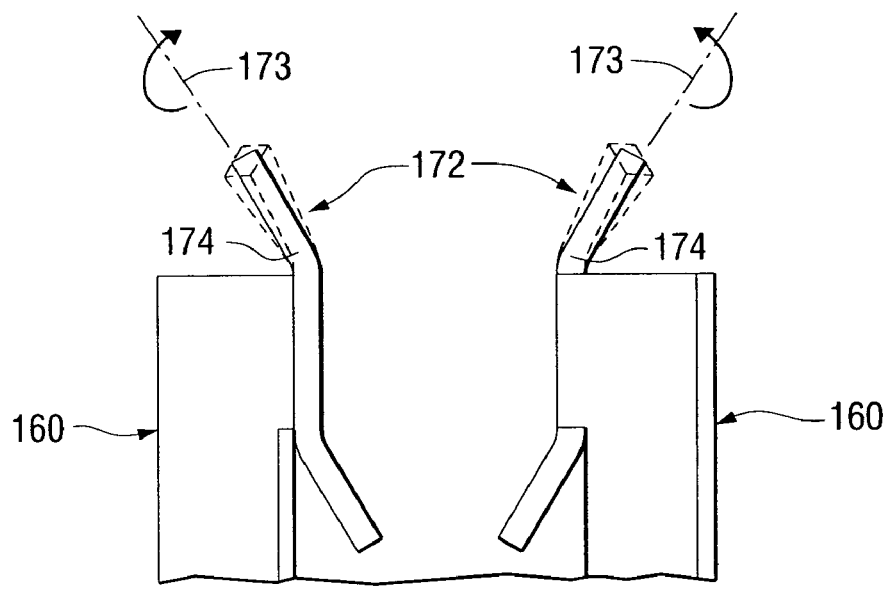
FIGS. 10a and 10b are schematic views of S-shaped mixing vanes that have been twisted in accordance with preferred embodiments of the present invention.
Figure 10B:
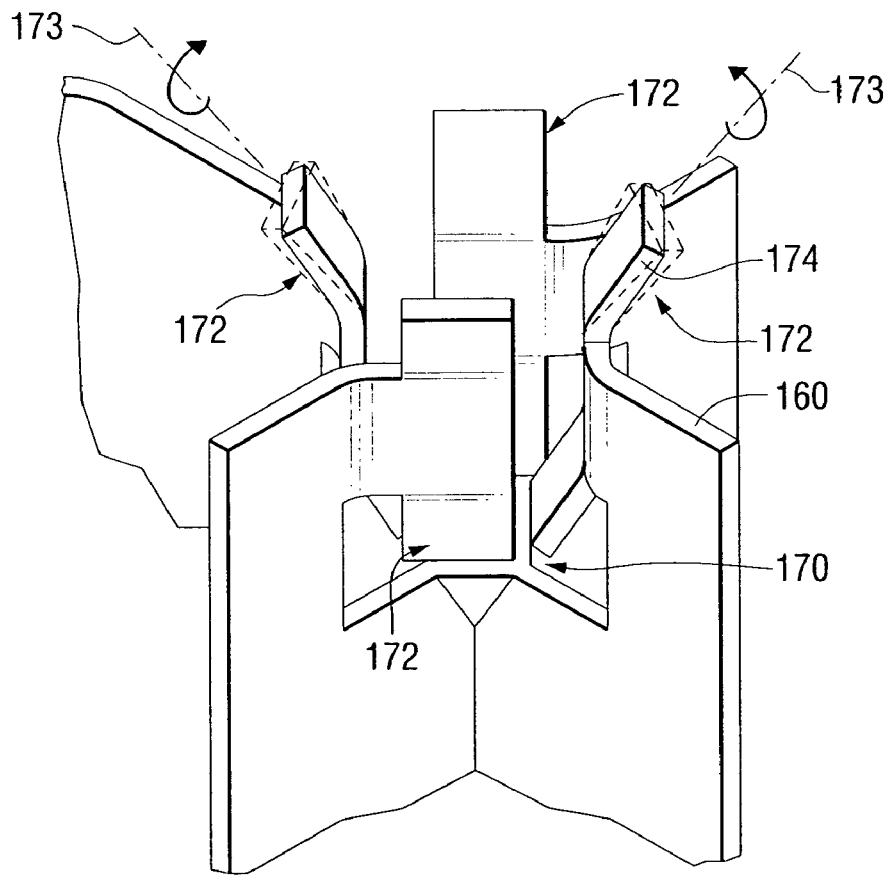

In addition to being bent or rotated, the upper piece 174, lower piece 176, and middle ligament 178 may be "twisted" (i.e., subjected to torsion) in a clockwise or counterclockwise direction, as shown in FIGS. 10a and 10b. FIG. 10a is a side view of two mixing vanes 172, wherein the upper piece 174 of each vane 172 is twisted. The "degree of twist" may range from about 0 to +90 degrees or from 0 to about −90 degrees (either clockwise or counterclockwise) with respect to axis 173. Although only the upper pieces 174 are twisted in the example of FIG. 10a, it will be appreciated that any suitable combination of twisting of one or both of the upper and lower pieces 174, 176 could be employed.

FIG. 10b is a partial perspective view of four mixing vanes 172 surrounding a grid strap intersection 170. In the example of FIG. 10b, the upper pieces 174 of two opposing mixing vanes 172 are twisted, while the upper pieces of the other two mixing vanes 172 are not. The degree of twist ranges from about 0 to +90 degrees or from about 0 to −90 degrees, in either a clockwise or counterclockwise direction. It will be appreciated that, in accordance with the invention, a single upper piece 174, lower piece 176, or middle ligament 178 may include multiple twists, and that the various mixing vanes 172 and components thereof, of a particular intersection 170 may have any suitable combination of bend, twist, and/or rotation.

Although the description contained hereinabove primarily refers to the use of four mixing vanes around a single fuel rod and four-walled cell, the present invention is not limited to any particular number of mixing vanes or placement of mixing vanes within the spacer grid. A spacer grid may contain fuel rods that are surrounded with mixing vanes and fuel rods that are not. Not every four-walled cell of a spacer grid is required to include a mixing vane. A fuel rod may be surrounded with anywhere from zero to four mixing vanes. A fuel rod is preferably surrounded with two or four mixing vanes. It is also preferable for the upper piece of each mixing vane to bend towards the fuel rod, and for the lower piece of each mixing vane to bend away from the fuel rod, although the mixing vanes in a given spacer grid may vary with respect to their bends, rotations, and twists. At least one upper piece may be twisted and/or bent with respect to the longitudinal axis of the cell walls, at least one lower piece may be twisted and/or bent with respect to the longitudinal axis of the cell walls, an d/or at least one middle ligament may be twisted and/or bent with respect to a plane on which the grid strap resides.

Whereas particular embodiments of this invention have been described above for purposes of illustration, it will be evident to those skilled in the art that numerous variations of the details of the present invention may be made without departing from the invention as defined in the appended claims.

What is claimed is:

1. A spacer grid for a nuclear fuel assembly including a plurality of elongated fuel rods and a coolant flowing over the fuel rods, the spacer grid comprising:
   a plurality of interlocking grid straps forming a plurality of four-walled cells structured to support the fuel rods therein, the four-walled cells each including four cell walls having a longitudinal axis; and
   a plurality of mixing vanes extending from each of the grid straps, each of the mixing vanes including a middle ligament directly extending from a top portion of a corresponding one of the grid straps, an upper piece extending from an upper portion of the middle ligament, and a lower piece extending from a lower portion of the middle ligament,
   wherein each of the upper piece and the lower piece has at least one of a predetermined bend angle and a predetermined degree of twist, and the middle ligament has at least one of a predetermined rotation angle and a predetermined degree of twist, in order to provide a predetermined affect on the coolant as it flows over the fuel rods and through the fuel assembly.

2. The spacer grid of claim 1, wherein the middle ligament extends in a substantially orthogonal direction with respect to the longitudinal axis of the cell wall.

3. The spacer grid of claim 1, wherein at least one of the upper piece and the lower piece of at least one of the mixing vanes is bent leftwardly or rightwardly with respect to the longitudinal axis of the cell wall, wherein the longitudinal axis is parallel to a vertical coolant flow stream through the fuel assembly.

4. The spacer grid of claim 1, wherein each of the grid straps has a corresponding plane; and wherein the middle ligament of at least one of the mixing vanes is rotated with respect to the plane.

5. The spacer grid of claim 1, wherein the middle ligament includes at least one pivot point; and wherein the middle ligament is twisted with respect to at least one of the at least one pivot point.

6. The spacer grid of claim 1, wherein at least one of the upper piece and the lower piece of at least one mixing vane is twisted.

7. The spacer grid of claim 1, wherein the upper piece is bent towards the four-walled cell structured to support a fuel rod; and wherein the lower piece is bent away from the four-walled cell structured to support a fuel rod, wherein both the upper piece and lower piece are bent with respect to the same longitudinal axis in order to provide the mixing vane with a generally S-shaped configuration.

8. The spacer grid of claim 1, wherein the upper piece is bent towards an adjacent one of the fuel rods; and wherein the lower piece is also bent toward the adjacent one of the fuel rods, in order to provide the mixing vane with a generally parabolic shape.

9. The spacer grid of claim 1, wherein one said mixing vane is extending from each cell wall of the spacer grid.

10. The spacer grid of claim 1, wherein the grid straps interlock in a generally perpendicular configuration in order to form the four-walled cells; and wherein at least one of the four-walled cells of the spacer grid includes four mixing vanes.

11. A nuclear fuel assembly comprising:
   a plurality of elongated fuel rods;

and
a plurality of spacer grids for securing the elongated fuel rods in an organized array, at least one of the plurality of spacer grids comprising:
a plurality of interlocking grid straps forming a plurality of four-walled cells for supporting the fuel rods therein, each of the four-walled cells including four cell walls having a longitudinal axis, and
a plurality of mixing vanes extending from each of the grid straps, each of the mixing vanes including a middle ligament directly extending from a top portion of a corresponding one of the grid straps, an upper piece extending from an upper portion of the middle ligament, and a lower piece extending from a lower portion of the middle ligament,
wherein each of the upper piece and the lower piece has at least one of a predetermined bend angle and a predetermined degree of twist, and the middle ligament has at least one of a predetermined rotation angle and a predetermined degree of twist, in order to provide a predetermined affect on a coolant as it flows over the fuel rods and through the fuel assembly.

12. The nuclear fuel assembly of claim 11, wherein the middle ligament extends in a substantially orthogonal direction with respect to the longitudinal axis of the cell wall.

13. The nuclear fuel assembly of claim 11, wherein at least one of the upper piece and the lower piece of at least one of the mixing vanes is bent leftwardly or rightwardly with respect to the longitudinal axis of the cell wall, wherein the longitudinal axis is parallel to a vertical coolant flow stream through the fuel assembly.

14. The nuclear fuel assembly of claim 11, wherein each of the grid straps has a corresponding plane; and wherein the middle ligament of at least one of the mixing vanes is rotated with respect to the plane.

15. The nuclear fuel assembly of claim 11, wherein the middle ligament includes at least one pivot point; and wherein the middle ligament is twisted with respect to at least one of the at least one pivot point.

16. The nuclear fuel assembly of claim 11, wherein at least one of the upper piece and the lower piece of at least one mixing vane is twisted.

17. The nuclear fuel assembly of claim 11, wherein the upper piece is bent towards the four-walled cell structured to support a fuel rod; and wherein the lower piece is bent away from the four-walled cell structured to support a fuel rod, wherein both the upper piece and lower piece are bent with respect to the same longitudinal axis in order to provide the mixing vane with a generally S-shaped configuration.

18. The nuclear fuel assembly of claim 11, wherein the upper piece is bent towards an adjacent one of the fuel rods; and wherein the lower piece is also bent toward the adjacent one of the fuel rods, in order to provide the mixing vane with a generally parabolic shape.

19. The nuclear fuel assembly of claim 11, wherein one said mixing vane is extending from each cell wall of the spacer grid.

20. The nuclear fuel assembly of claim 11, wherein the grid straps interlock in a generally perpendicular configuration in order to form the four-walled cells; and wherein at least one of the four-walled cells of the spacer grid includes four mixing vanes.

21. The spacer grid of claim 1, wherein the bend angle and/or the degree of twist of the upper piece being independent from the bend angle and/or the degree of twist of the lower piece.

22. The nuclear fuel assembly of claim 11, wherein the bend angle and/or the degree of twist of the upper piece being independent from the bend angle and/or the degree of twist of the lower piece.

23. A spacer grid for a nuclear fuel assembly including a plurality of elongated fuel rods and a coolant flowing over the fuel rods, the spacer grid comprising:
a plurality of interlocking grid straps forming a plurality of four-walled cells structured to support the fuel rods therein, the four-walled cells each including four cell walls having a longitudinal axis; and
a plurality of mixing vanes extending from each of the grid straps, each of the mixing vanes including a middle ligament extending from a top portion of a corresponding one of the grid straps, an upper piece extending from an upper portion of the middle ligament, and a lower piece extending from a lower portion of the middle ligament,
wherein each of the upper piece and the lower piece has at least one of a predetermined bend angle and a predetermined degree of twist, the bend angle and/or the degree of twist of the upper piece being independent from the bend angle and/or the degree of twist of the lower piece, and the middle ligament has at least one of a predetermined rotation angle and a predetermined degree of twist, in order to provide a predetermined affect on the coolant as it flows over the fuel rods and through the fuel assembly.

24. The spacer grid of claim 23 wherein the middle ligament is directly extending from a top portion of a corresponding one of the grid straps.

25. A nuclear fuel assembly comprising:
a plurality of elongated fuel rods; and
a plurality of spacer grids for securing the elongated fuel rods in an organized array, at least one of the plurality of spacer grids comprising:
a plurality of interlocking grid straps forming a plurality of four-walled cells for supporting the fuel rods therein, each of the four-walled cells including four cell walls having a longitudinal axis, and
a plurality of mixing vanes extending from each of the grid straps, each of the mixing vanes including a middle ligament extending from a top portion of a corresponding one of the grid straps, an upper piece extending from an upper portion of the middle ligament, and a lower piece extending from a lower portion of the middle ligament,
wherein each of the upper piece and the lower piece has at least one of a predetermined bend angle and a predetermined degree of twist, the bend angle and/or the degree of twist of the upper piece being independent from the bend angle and/or the degree of twist of the lower piece, and the middle ligament has at least one of a predetermined rotation angle and a predetermined degree of twist, in order to provide a predetermined affect on a coolant as it flows over the fuel rods and through the fuel assembly.

26. The nuclear fuel assembly of claim 25, wherein the middle ligament is directly extending from a top portion of a corresponding one of the grid straps.

27. A spacer grid for a nuclear fuel assembly including a plurality of elongated fuel rods and a coolant flowing over the fuel rods, the spacer grid comprising:
a plurality of interlocking grid straps forming a plurality of four-walled cells structured to support the fuel rods therein, the four-walled cells each including four cell walls having a longitudinal axis; and a plurality of mixing vanes extending from each of the grid straps, each of the mixing vanes including a middle ligament extending from a top portion of a corresponding one of the grid straps, an upper piece extending from an upper portion of the middle ligament, and a lower piece extending from a lower portion of the middle ligament, wherein each of the upper piece and the lower piece has at least one of a predetermined bend angle and a predetermined degree of twist, and the middle ligament has at least one of a predetermined rotation angle and a predetermined degree of twist, in order to provide a predetermined affect on the coolant as it flows over the fuel rods and through the fuel assembly, and wherein the upper piece and lower piece are structured such that the upper and lower pieces are not directly extending from a top portion of a corresponding one of the grid straps.

28. The spacer grid of claim 27 wherein the middle ligament is directly extending from a top portion of a corresponding one of the grid straps.

29. The spacer grid of claim 27 wherein the bend angle and/or the degree of twist of the upper piece being independent from the bend angle and/or the degree of twist of the lower piece.

\* \* \* \* \*